United States Patent [19]

Patchell

[11] Patent Number: 5,668,539

[45] Date of Patent: Sep. 16, 1997

[54] THERMAL EMITTED RADIATION DETECTING DEVICE

[75] Inventor: John W. Patchell, Carleton Place, Canada

[73] Assignee: 1138037 Ontario Ltd., Canada

[21] Appl. No.: 602,467

[22] Filed: Feb. 16, 1996

[30] Foreign Application Priority Data

Aug. 30, 1995 [CA] Canada .................. 2157237

[51] Int. Cl.⁶ ............................ G08G 1/16
[52] U.S. Cl. ............. 340/903; 340/567; 340/904; 250/349
[58] Field of Search ............... 340/903, 435, 340/436, 567, 904, 905, 961, 968; 356/349; 250/349

[56] References Cited

U.S. PATENT DOCUMENTS

| | | | |
|---|---|---|---|
| 4,136,954 | 1/1979 | Jamieson | 356/349 |
| 4,260,980 | 4/1981 | Bates | 340/32 |
| 4,263,585 | 4/1981 | Schaefer | 340/567 |
| 4,447,800 | 5/1984 | Kasuya et al. | 340/904 |
| 4,450,430 | 5/1984 | Barishpolsky et al. | 340/904 |
| 4,523,095 | 6/1985 | Keller-Steinbach | 250/349 |
| 4,694,295 | 9/1987 | Miller et al. | 340/903 |
| 4,766,421 | 8/1988 | Beggs et al. | 340/904 |
| 4,906,976 | 3/1990 | Guscott | 340/567 |
| 4,914,673 | 4/1990 | Imura | 374/130 |
| 4,926,170 | 5/1990 | Beggs et al. | 340/904 |
| 5,083,025 | 1/1992 | Blomberg | 250/353 |
| 5,107,120 | 4/1992 | Tom | 340/567 |
| 5,122,796 | 6/1992 | Beggs et al. | 340/904 |
| 5,149,025 | 9/1992 | Utterback et al. | 246/169 |
| 5,166,681 | 11/1992 | Bottesch et al. | 340/933 |
| 5,173,881 | 12/1992 | Sindle | 367/101 |
| 5,249,128 | 9/1993 | Markandey et al. | 364/426.04 |
| 5,249,157 | 9/1993 | Taylor | 340/903 |
| 5,280,555 | 1/1994 | Ainsburg | 385/116 |
| 5,313,335 | 5/1994 | Gray et al. | 359/839 |
| 5,339,075 | 8/1994 | Abst et al. | 340/903 |
| 5,381,009 | 1/1995 | Brownell | 250/342 |
| 5,442,178 | 8/1995 | Baldwin | 250/353 |
| 5,455,707 | 10/1995 | Cipolla | 359/199 |

FOREIGN PATENT DOCUMENTS

| | | | |
|---|---|---|---|
| 1195752 | 10/1985 | Canada | 340/124.4 |
| 1271991 | 7/1990 | Canada | 340/124.4 |
| 2108718 | 4/1994 | Canada . | |
| 2124363 | 2/1984 | United Kingdom . | |
| WO 86/03916 | 7/1986 | WIPO | H04N 3/09 |
| WO 95/25322 | 9/1995 | WIPO . | |

*Primary Examiner*—Jeffery Hofsass
*Assistant Examiner*—Davetta Woods
*Attorney, Agent, or Firm*—Hayes, Soloway, Hennessey, Grossman & Hage, P.C.

[57] ABSTRACT

A thermal emitted radiation detecting device is configured to detect objects in visual blind spots of a vehicle. A low cost differential detector is used which is sensitive to temperature change. Optics train two different fields of view on the detector and switch between the two fields of view to provide a blind spot field of view and a reference field of view. The presence of a vehicle in the blind spot field of view results in a temperature difference between the two fields of view. The resulting detector output signal is compared to predetermined threshold levels and then used to provide an indication, either visual or audible. Several embodiments of optics and switching fields of view are provided.

28 Claims, 5 Drawing Sheets

Lens Elements

| | Vertical Centre | Horizontal Centre | Diameter |
|---|---|---|---|
| 1 | 1.875 mm | 0.00 mm | 10 mm |
| 2 | 1.25 mm | 4.36 mm | 5.8 mm |
| 3 | 1.875 mm | 8.72 mm | 5.8 mm |
| 4 | 2.5 mm | 13.09 mm | 5.8 mm |

Frenel Lens Elements focal length  25 mm
polyethylene

5,668,539

THERMAL EMITTED RADIATION DETECTING DEVICE

The present invention is concerned with a thermal emitted radiation detector device and is particularly concerned with using such a device to detect objects in a blind spot.

BACKGROUND OF THE INVENTION

The problem of detecting the presence of a trailing vehicle in the blind spot of a vehicle is well known. For example, U.S. Pat. No. 5,122,796 issued Jun. 16, 1992 to George Beggs et al and assigned to Auto-Sense Ltd., discloses an active system using an electro-optic emitter and receiver. The emitter operates in a short wavelength infrared region thereby avoiding interference from long wavelength infrared or thermal emitted radiation sources such as hot objects. A band pass filter is used to limit the detector to the pass band of the emitter.

For add-on devices in automotive applications, it is desirable to operate with power sources independent of the main vehicle power system. Active devices such as the Beggs et al emitter/detector system have a relatively high power consumption and may need connection to the vehicle's electrical system.

Passive detector systems have been proposed. For example, the present inventor is a co-inventor of a PCT International Patent Application filed Mar. 10, 1995, proposes using a thermal emitted radiation detector of the type found in security system motion detectors for a passive blind spot detector. This type of thermal emitted radiation detector requires a change in temperature to provide an output.

As in the motion detector application, the proposed detector relies upon movement of the heat-generating object through the field of view of the detector to generate an output signal. This type of detector is, however, insensitive to relatively stationary objects. Hence, a trailing vehicle, remaining in the blind spot, if remaining in a fixed relative position, becomes undetectable and may be forgotten by the vehicle operator.

SUMMARY OF THE INVENTION

An object of the present invention is to provide an improved thermal emitted radiation detecting device.

In accordance with an aspect of the present invention there is provided a thermal emitted radiation detecting device for detecting objects in a blind spot comprising: detector means for generating an output signal responsive to thermal emitted radiation; means for defining first and second fields of view relative to the detector means; means for switching the field of view detected to generate a combined output signal; and means for deriving an indication of a proximate object from the combined output signal.

In accordance with another aspect of the present invention there is provided a thermal emitted radiation detecting device for detecting objects in a blind spot comprising: a detector responsive to changes in thermal emitted radiation received to generate an output signal; optics for defining first and second fields of view relative to the detector; a shutter for switching the field of view detected to generate a combined output signal; a signal generator for providing a square wave of predetermined frequency for operating the shutter; a high-pass filter connected to the detector for filtering the combined output signal; a demodulator connected to the highpass filter and the signal generator for deriving an object event signal; and an annunciator for comparing the object event signal to predetermined thresholds and providing an indication of the presence of an object in the blind spot.

An advantage of the present invention is the ability to detect a relatively stationary object in a blind spot. Another advantage of the present invention is relative insensitivity to variations in surface temperatures common to the fields of view.

DESCRIPTION OF THE DRAWINGS

The present invention will be further understood from the following description with reference to the drawings in which.

DETAILED DESCRIPTION

Figure 1:
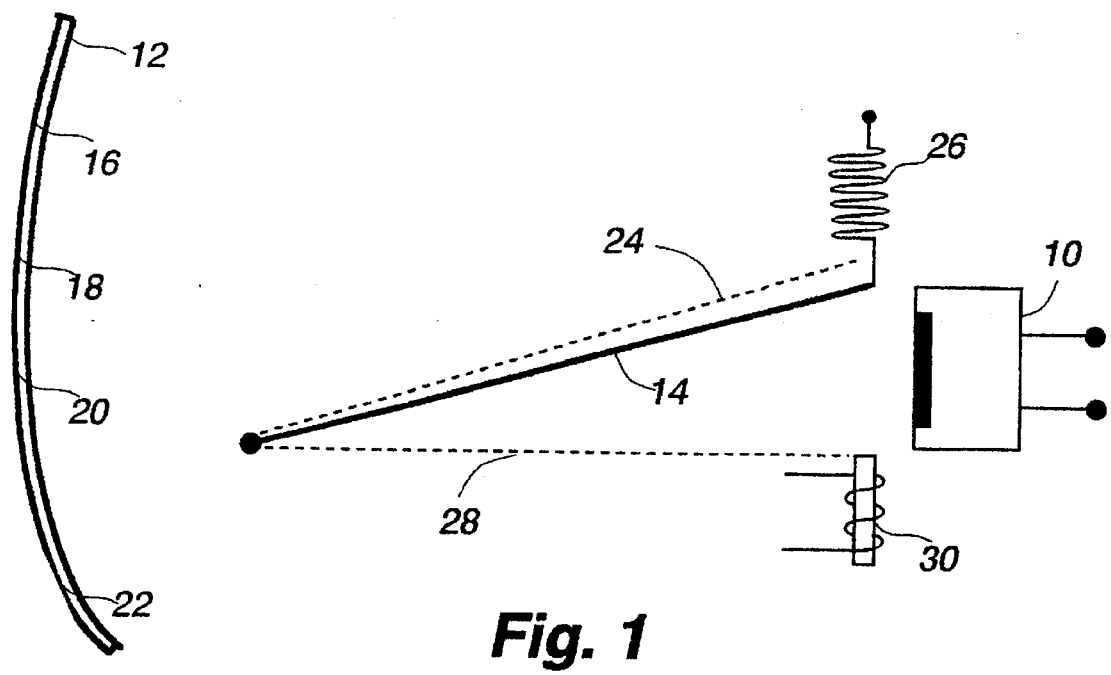
FIG. 1 illustrates a thermal emitted radiation detecting device in accordance with a preferred embodiment of the present invention.

Referring to FIG. 1 there is illustrated a blind spot detector in accordance with an embodiment of the present invention. The blind spot detector includes a thermal emitted radiation detector 10, Fresnel lens 12 in spaced relationship from the thermal emitted radiation detector 10 and a shutter 14 disposed between the thermal emitted radiation detector 10 and the Fresnel lens 12. The Fresnel lens 12 includes four lens elements, lens elements 16, 18 and 20 defining fields of view for the detector 10 corresponding to the blind spot and lens element 22 defining a field of view for the detector 10 directed toward a reference point on the road behind the vehicle. The shutter 14 is operated between a first position 24 and is biased toward that position the return spring 26 and a second position 28 and is attracted toward that second position by an electromagnet 30. In the first position 24 the shutter blocks the fields of view from the lens elements 16, 18 and 20 corresponding to the blind spot of the vehicle and allows the field of view from the lens element 22 corresponding to the reference spot on the road to fall on the detector 10. In the second position 28 on energizing electromagnet 30 the shutter blocks the field of view from the lens element 22 and allows the fields of view from lens elements 16, 18 and 20 corresponding to the blind spot of the vehicle to fall on the detector 10. As the detector 10 is sensitive to changes in temperature the switching between fields of view from a reference point on the road behind the vehicle to the blind spot of the vehicle will provide a difference if there is a vehicle present within the blind spot.

Figure 2:
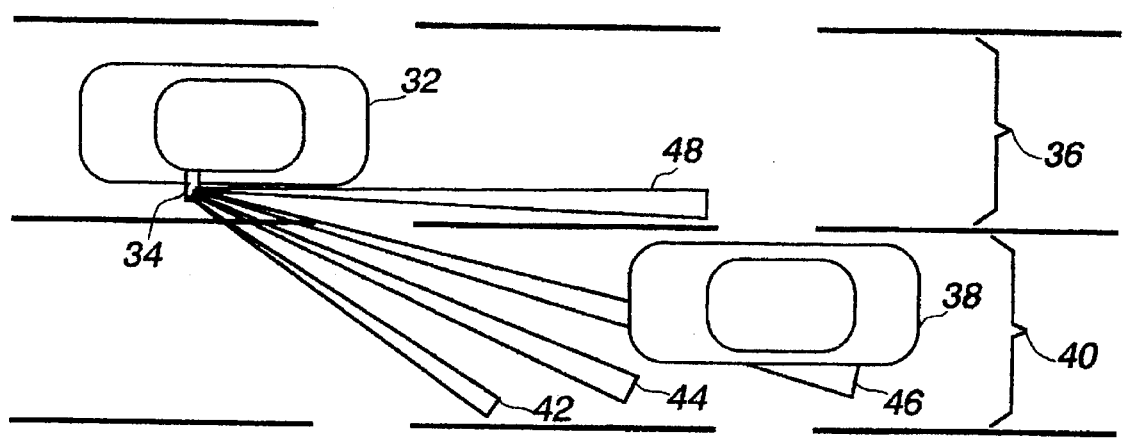
FIG. 2 illustrates operation of the thermal emitted radiation detecting device of FIG. 1 mounted on a leading vehicle to detect, in its visual blind spot, the presence of a trailing vehicle.

Referring to FIG. 2 a vehicle 32 has mounted a blind spot detector 34 in accordance with the present invention and travels along a road in a lane 36. A second vehicle 38 trails the first vehicle in an adjacent lane 40. The blind spot detector 34 establishes fields of view 42, 44 and 46 within the blind spot of the vehicle and generally directed toward a lane 40 and a reference field of view 48 directed behind the vehicle 32 in the lane 36. The fields of view 42, 44, 46 and 48 correspond to the Fresnel lens elements 16, 18, 20 and 22, respectively. The thermal emitted radiation detector 10, for the 8–14 micron range, is preferably a single element pyroelectric detector such as the Hamamatsu P4736. As an alternative a pyroelectric detector having two sensing elements, for example, a Hynman LAH958 may be used with one of the detecting elements covered. Alternatively, a semicustom device could be used. Such devices are usually manufactured with a large resistor, e.g. 100 GOhm, in parallel to the detecting elements. A lower value of this resistor provides a wider effective bandwidth with a tradeoff of less sensitivity at lower frequencies. For the present embodiment, in which a lower frequency cutoff of about 10 Hz is desired, a resistor value of about 100 MOhm would be appropriate. These types of pyroelectric detectors are sensitive to changes in temperature and not to absolute temperature thus the detector must see a change in temperature in order to generate an output signal. This change in temperature will occur when a heat generating object such as an operating vehicle is detected in one of the fields of view of the detector. The change in temperature between one of the blind spot fields of view and the reference field of view is accomplished in the preferred embodiment by means of a shutter mechanism. The shutter is driven at a constant rate of 10 Hertz. The rate of operation must be slow enough to come within the band pass of the pyroelectric detector used and must be fast enough to provide sufficient warning of a vehicle entering the blind spot. The pyrodetector response limits the maximum shutter speed to less than 50 Hertz while need for detection of the vehicle limits the lower speed to approximately 2 Hertz. At this lower speed there is one measurement of the blind spot field of view every 500 milliseconds. Assuming a vehicle approaching at a relative speed of 20 km/h (5.6 meter/second), this gives a change in distance between samples of 2.3 meters. Thus, if the maximum detection range of the unit is 10 meters an approaching vehicle will be detected somewhere between 10 and 7.6 meters. The reference field of view 40 is directed behind the vehicle in an area that is not in the blind spot of a driver and in which a vehicle would not normally be positioned. Switching between the reference field of view 48 and the blind spot fields of view 42, 44 and 46 provides the necessary change in temperature for the detector where the heat generating objects such as an operating vehicle is present within those fields of view.

Figure 3:
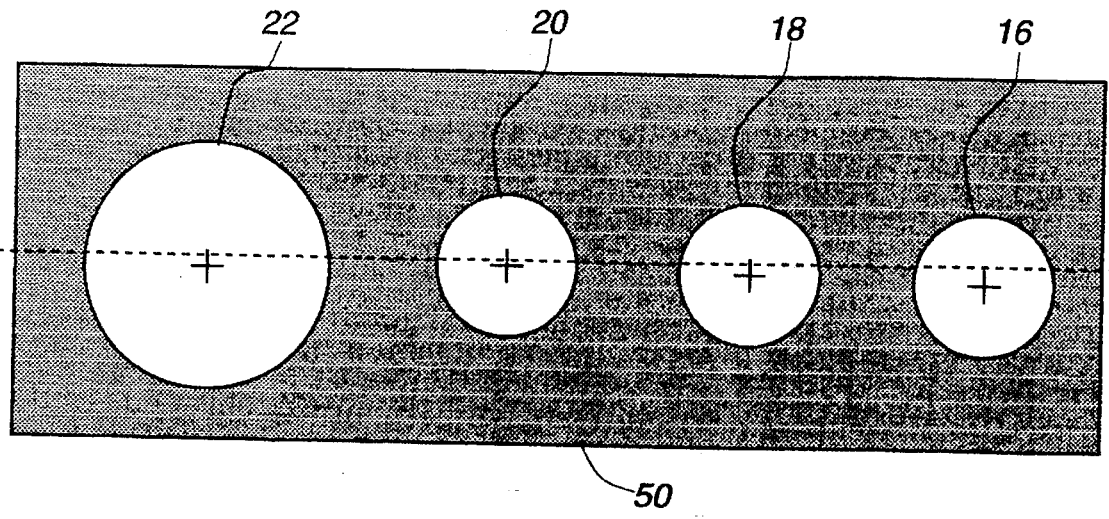
FIG. 3 schematically illustrates a compound Fresnel lens used in the thermal emitted radiation detecting device of FIG. 1.

Referring to FIG. 3 there is illustrated a Fresnel lens in accordance with the preferred embodiment of the present invention. The Fresnel lens includes lens elements 16, 18 and 20 directed toward the vehicle blind spot and lens element 22 directed toward the road behind the vehicle. The lens elements 16, 18, and 20 are offset from each other to provide different fields of view, as illustrated in FIG. 2. The Fresnel lens 12 also includes a thermal emitted radiation opaque mask 50 around the lens areas. The blind spot lens elements 16, 18 and 20 have a total area equal to the road viewing lens 22. This ensures that the thermal emitted radiation collected by the three blind spot lenses on an empty road will be equivalent to that collected by the road only lens 22. This is true as long as the road temperature is relatively constant over the road only and blind spot fields of view.

Figure 4:
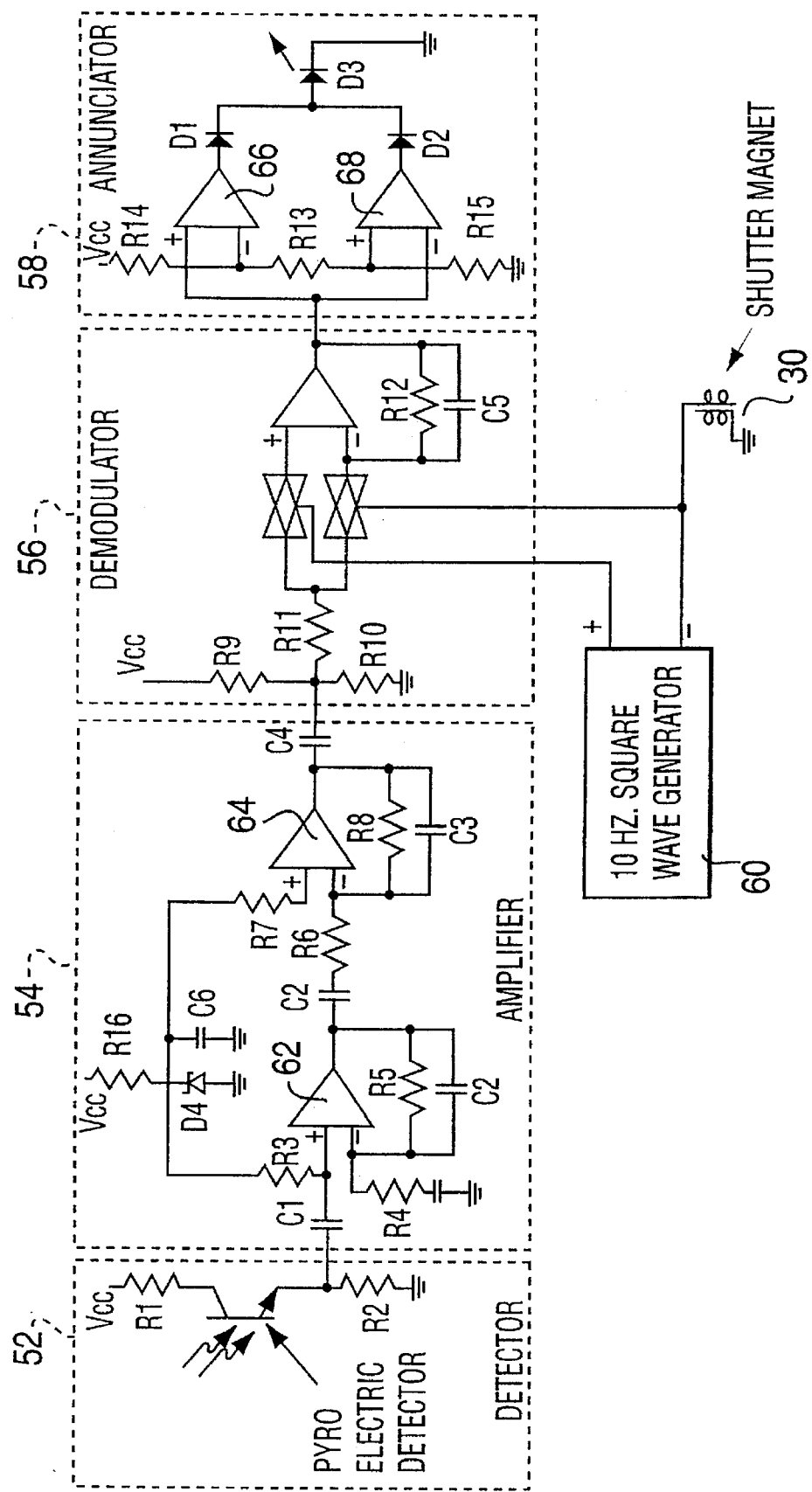
FIG. 4 schematically illustrates a circuit for deriving an indication of the presence of a trailing vehicle for use with the detector of FIG. 1 in accordance with a preferred embodiment of the present invention.

Referring to FIG. 4 there is schematically illustrated a circuit for driving the charter mechanism and for driving from the detector an indication of the presence of a vehicle within the blind spot. In accordance with an embodiment of the present invention the circuit includes a detector circuit 52 providing input to an amplifier circuit 54 which provides input to a demodulator circuit 56 which provides input to an annunciator circuit 58. The demodulator circuit 56 is driven by a 10 Hertz square wave generator 60 which also drives the shutter electromagnet 30. The detector circuit 52 includes the pyroelectric detector 10. Output from the detector is capacitively coupled via capacitor C1 to the amplifier circuit 52 provided with two amplification stages 62 and 64. The amplifier circuit 54 acts as a high pass filter with a cut off frequency of about 10 Hertz. The output of the amplifier circuit 54 is applied as input to the demodulator circuit 56. The demodulator circuit 56 is operated at a frequency of 10 Hertz by applying the output of the 10 Hertz square wave generator 60 to switches within the modulator circuit. The annunciator circuit 58 having comparators 66 and 68 compares the output of the demodulator circuit 56 to threshold values to determine the presence of a vehicle in the blind spot and in response provides an output indication in the form of a drive signal to an LED D3.

Figure 5A:
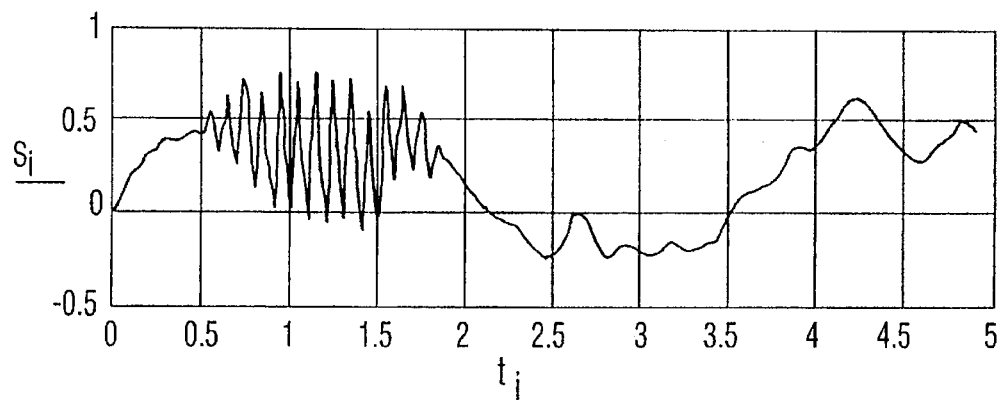
FIGS. 5a, 5b, and 5c graphically illustrate typical signals at various stages of the circuit of FIG. 4.
Figure 5B:
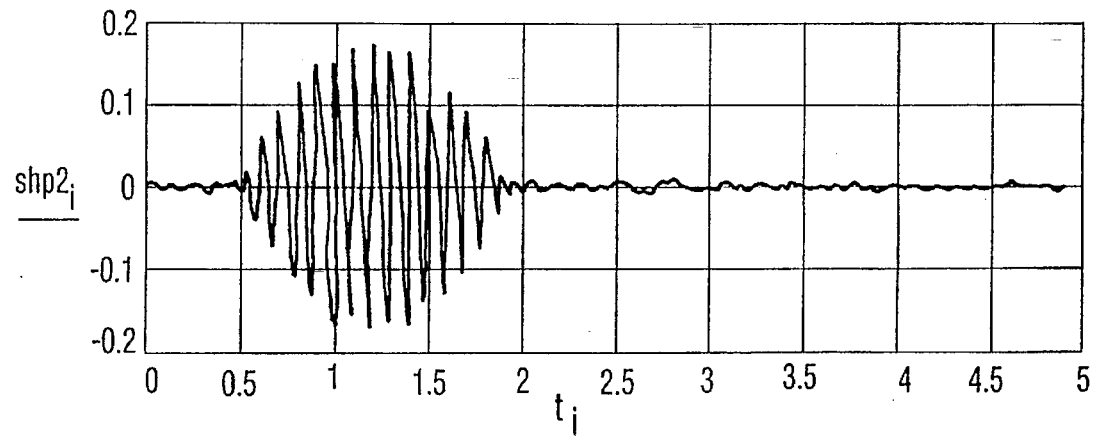
Figure 5C:
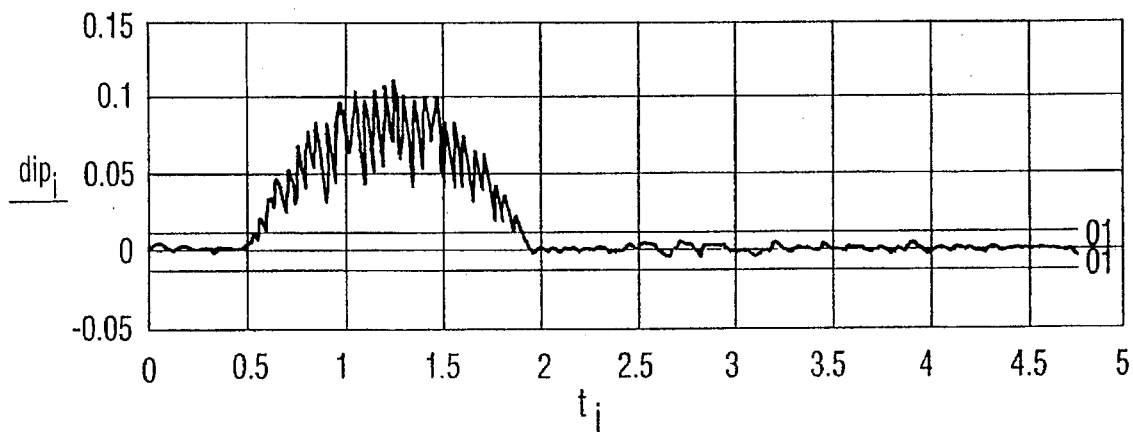

Referring to FIGS. 5a, 5b and 5c there are graphically illustrated the outputs of the detector 52, the amplifier 54 and the demodulator 56 with the thresholds applied by the annunciator circuit 58 superimposed thereon.

FIG. 5a graphically illustrates a typical raw signal output from the pyroelectrical detector 10. This signal contains a response from a car in the blind spot between 0.5 to 1.8 seconds superimposed on the signal caused by variations in the road temperature. The background signal caused by the variations of the road is predominantly lower frequency, hence high pass filtering will separate a car signal from the background signal. The amplifier circuit 54 operates as a high pass filter with a cut off frequency of 10 Hertz and produces an output signal from the input signal of 5a as shown in FIG. 5b. The signal of FIG. 5b is then demodulated by switching polarity synchronously with the shutter to produce a detection signal as illustrated in FIG. 5c. The annunciator circuit 58 then compares this signal with threshold values in order to determine the presence of a vehicle in the blind spot.

Figure 6:
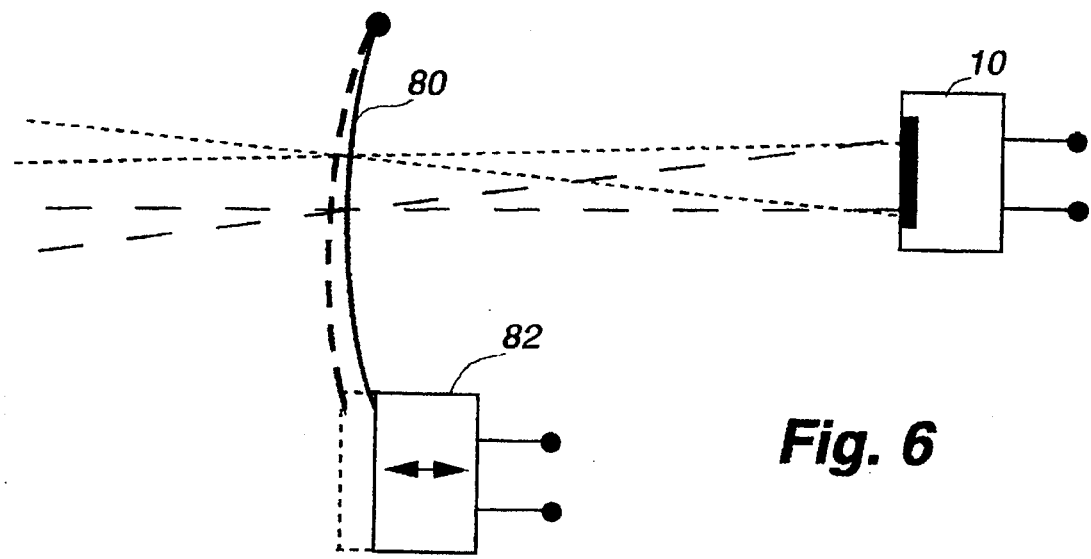
FIG. 6 illustrates a second embodiment of the thermal emitted radiation detector.
Figure 7:
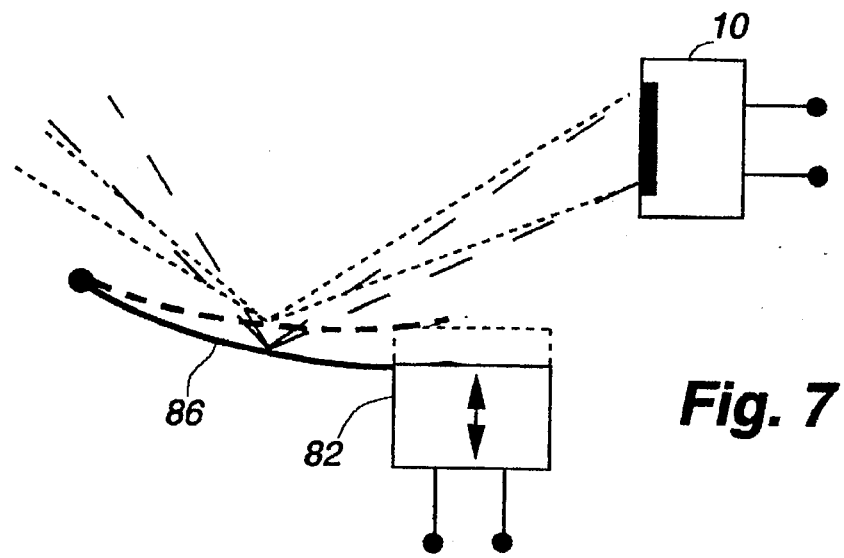
FIG. 7 illustrates a third embodiment of the thermal emitted radiation detector.
Figure 8:
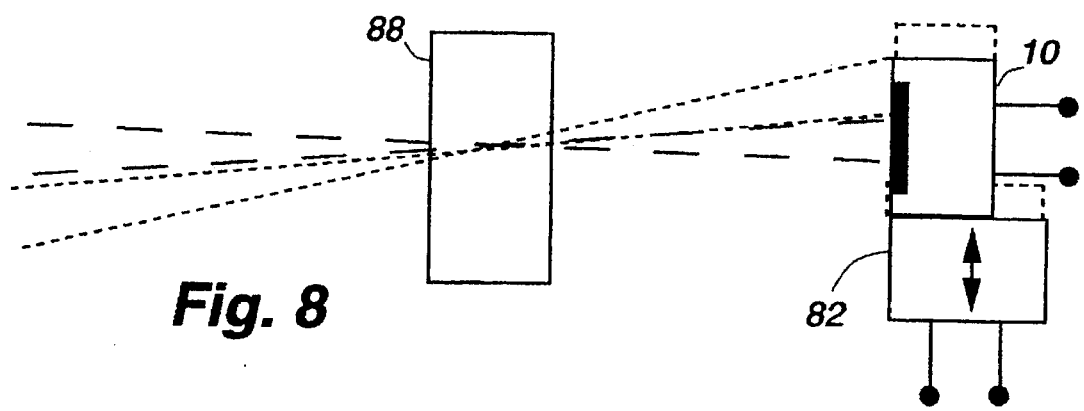
FIG. 8 illustrates a fourth embodiment of the thermal emitted radiation detector.

FIGS. 6, 7 and 8 illustrate alternative embodiments of the thermal emitted radiation detector. In the preferred embodiment of FIG. 1, the reference field of view of the road surface and fields of view of the blind spot are defined by Fresnel lens elements 16, 18, 20 and 22, respectively, with selection of the field of view being determined by the shutter 14. It is possible to provide various mechanical shutter arrangements for example vibrating reeds or rotating blades. A LCD used as a shutter may work with thermal emitted radiation, but requires further investigation. It is also possible to change the field of view of the detector 10 by other means as described hereinbelow.

Referring to FIG. 6, a single Fresnel lens 80 is provided and supported at one side by a vibrating device 82. The vibrating device 82 may be electromechanical or piezoelectric in nature. On application of the drive signal to the vibrating device 82 the Fresnel lens 80 is rocked between two positions, corresponding to a reference field of view and a blind spot field of view. As the detector 10 is sensitive to change in temperature, the change in fields of view results in an output signal being generated with the presence of a vehicle in the blind spot. Operation of the rest of the detector is as described with regard to the preferred embodiment. As is well known the optical elements, lenses, and the optical elements, mirrors, may be interchanged. Hence the Fresnel lens of FIG. 6 may be replaced by a concave mirror.

FIG. 7 illustrates such an arrangement in a third embodiment of the present invention. In the third embodiment, the Fresnel lens 80, of FIG. 6, is replaced by a concave mirror 86. The mirror 86 is mounted in a similar manner to the Fresnel lens, and in operation vibrates between two fields of view.

The fourth embodiment of FIG. 8 uses fixed optics 88, i.e. a lens or a mirror, but imparts relative movement to the detector to define two fields of view.

While the embodiments of FIGS. 6 through 8 have been described using the square wave generator of the preferred embodiment of FIG. 1 other waveforms are possible. The embodiments of FIGS. 6 through 8 define fields of view based on relative position and would capable of continuous movement between positions if the detector has sufficient bandwidth. For example, either an MCT (HgCdTe) detector or a pyro-electric with a relatively low parallel resistor (about 1 MOhm) would have sufficient bandwidth. Hence, a sawtooth waveform could be used to drive the vibration device 82 to cause the field of view to sweep an area within the blind spot. For example, the field of view could be swept from a relatively near position to a relatively remote position within the blind spot, thereby combining a reference field-of-view and blind spot field-of-view in a continuous scan. In addition, a phase discriminator could be added to quantify the relative position of the vehicle indication, and different colored LEDs could be used to display relative position. For example red yellow and green, corresponding to near, intermediate or distance positions of the vehicle in the blind spot.

While embodiments of the present invention are described in the context of detecting trailing vehicles in the rear visual blind spot of the lead vehicle, other applications of the present invention are envisioned. For example, the present invention may be used on the front of a school bus to detect children not visible to the driver. The present invention may also be used to detect people and vehicles in the blind spot directly behind large trucks, to warn the driver before backing up.

Numerous modification, variations, and adaptations may be made to the particular embodiments of the invention described above without departing from the scope of the invention, which is defined in the claims.

What is claimed is:

1. A thermal emitted radiation detecting device for detecting objects in a blind spot comprising:
   detector means for generating an output signal responsive to thermal emitted radiation;
   means for defining first and second fields of view relative to the detector means;
   means for switching the field of view detected to generate a combined output signal; and
   means for deriving an indication of a proximate object from the combined output signal, whereby the first field of view comprises the blind spot and the second field of view comprises a reference field and switching between the first and second fields generates a difference in thermal emitted radiation at the detector means when the proximate object is in the first field of view.

2. A device as claimed in claim 1 wherein the detector means comprises a differential thermal emitted radiation detector.

3. A device as claimed in claim 2 wherein said means for defining first and second fields of view comprise optics having first and second optical elements.

4. A device as claimed in claim 3 wherein said first and second optical elements are Fresnel lenses.

5. A device as claimed in claim 3 wherein said first and second optical elements are concave mirrors.

6. A device as claimed in claim 2 wherein said means for defining first and second fields of view comprise optics having a single optical element capable of movement between a first position and a second position corresponding to respective first and second fields of view.

7. A device as claimed in claim 6 wherein the optical element is Fresnel lens.

8. A device as claimed in claim 6 wherein the optical element is concave mirror.

9. A device as claimed in claim 6 wherein the optical element is a planar mirror and the optics further comprise a fixed optical element.

10. A device as claimed in claim 9 wherein the fixed optical element is Fresnel lens.

11. A device as claimed in claim 9 wherein the fixed optical element is concave mirror.

12. A device as claimed in claim 3 wherein said means of switching comprises a shutter operable between first and second positions corresponding to allowing respective first and second fields of view to be detected.

13. A device as claimed in claim 12 wherein the shutter includes an opaque panel pivotally disposed between the detector and the optics, a spring biasing the panel to the first position and an electromagnet for attracting the panel to second position.

14. A device as claimed in claim 12 wherein the shutter includes a resilient reed disposed between the detector and the optics and an electromagnet for causing the reed to vibrate at a predetermined frequency.

15. A device as claimed in claim 12 wherein the shutter includes a rotary blade disposed between the detector and the optics.

16. A device as claimed in claim 6 wherein said means of switching comprises a vibrator for effecting movement of the optics between first and second positions corresponding to allowing respective first and second fields of view to be detected.

17. A device as claimed in claim 16 wherein the vibrator is a piezoelectric device.

18. A device as claimed in claim 16 wherein the vibrator is an electromechanical device.

19. A device as claimed in claim 1 wherein the means for detecting comprises first and second proportional detectors and wherein said first and second fields of view relate respectively thereto.

20. A device as claimed in claim 19 wherein the means for switching comprises an electrical switch for switching between the outputs of said first and second detectors.

21. A device as claimed in claim 1 wherein said means for deriving an indication includes a high-pass filter.

22. A device as claimed in claim 21 wherein the means for deriving includes an amplifier.

23. A device as claimed in claim 22 wherein the means for deriving includes a demodulator operable at a predetermined frequency corresponding to the frequency of operating the means for switching.

24. A device as claimed in 23 wherein the means for deriving includes and annunciator.

25. A device as claimed in claim 3 wherein the means for switching includes a square wave generator of predetermined frequency.

26. A device as claimed in claim 6 wherein the means for switching includes a square wave generator of predetermined frequency.

27. A device as claimed in claim 6 wherein the means for switching includes a saw-tooth wave generator of predetermined frequency.

28. A thermal emitted radiation detecting device for detecting objects in a blind spot comprising:

a detector responsive to changes in thermal emitted radiation received to generate an output signal;

optics for defining first and second fields of view relative to the detector;

a shutter for switching the field of view detected to generate a combined output signal;

a signal generator for providing a square wave of predetermined frequency for operating the shutter;

a high-pass filter connected to the detector for filtering the combined output signal;

a demodulator connected to the high-pass filter and the signal generator for deriving an object event signal; and an annunciator for comparing the object event signal to predetermined thresholds and providing an indication of the presence of an object in the blind spot, whereby the first field of view comprises the blind spot and the second field of view comprises a reference field and switching between the first and second fields generates a difference in thermal emitted radiation at the detector means when the proximate object is in the first field of view.

* * * * *

UNITED STATES PATENT AND TRADEMARK OFFICE
CERTIFICATE OF CORRECTION

PATENT NO. : 5,668,539
DATED : September 16, 1997
INVENTOR(S) : John W. Patchell It is certified that error appears in the above-identified patent and that said Letters Patent is hereby corrected as shown below:

Column 2, line 20, delete "5a, 5b, and 5c" and insert --5A, 5B and 5C--

Column 3, line 45, delete "40" and insert --48--,

Column 4, line 2, delete "driving" and insert --deriving--

Column 4, line 14, delete "54" and insert --52--

Column 4, line 25, delete "5a, 5b and 5c" and insert --5A, 5B and 5C--

Column 4, line 29, delete "5a" and insert --5A--,

Column 4, line 38, delete "5a" and insert --5A--,

Column 4, line 39, delete "5b" (both occurrences) and insert --5B--

UNITED STATES PATENT AND TRADEMARK OFFICE
CERTIFICATE OF CORRECTION

PATENT NO. : 5,668,539
DATED     : September 16, 1997
INVENTOR(S) : John W. Patchell It is certified that error appears in the above-identified patent and that said Letters Patent is hereby corrected as shown below:

Column 4, line 41, delete "5c" and insert --5C--

Column 5, line 19, after "would" and before "capable" insert --be--

Column 5, line 20, delete "MCT" and insert --HCT--

Signed and Sealed this

Eleventh Day of May, 1999

Attest:

Q. TODD DICKINSON

*Attesting Officer*     *Acting Commissioner of Patents and Trademarks*